(12) United States Patent
Rudrachar

(10) Patent No.: US 11,799,741 B2
(45) Date of Patent: Oct. 24, 2023

(54) SYSTEMS AND METHODS FOR ENTERPRISE INFORMATION TECHNOLOGY (IT) MONITORING

(71) Applicant: Fannie Mae, Washington, DC (US)

(72) Inventor: Jay G. Rudrachar, Washington, DC (US)

(73) Assignee: Fannie Mae, Washington, DC (US)

( * ) Notice: Subject to any disclaimer, the term of this patent is extended or adjusted under 35 U.S.C. 154(b) by 0 days.

(21) Appl. No.: 17/082,850

(22) Filed: Oct. 28, 2020

(65) Prior Publication Data

US 2021/0126839 A1 Apr. 29, 2021

Related U.S. Application Data

(60) Provisional application No. 62/927,579, filed on Oct. 29, 2019.

(51) Int. Cl.
| | |
|---|---|
| *H04L 41/5009* | (2022.01) |
| *H04L 43/0817* | (2022.01) |
| *H04L 43/06* | (2022.01) |
| *H04L 43/045* | (2022.01) |
| *H04L 41/16* | (2022.01) |

(52) U.S. Cl.
CPC ........ *H04L 41/5009* (2013.01); *H04L 43/045* (2013.01); *H04L 43/06* (2013.01); *H04L 43/0817* (2013.01); *H04L 41/16* (2013.01)

(58) Field of Classification Search
None
See application file for complete search history.

(56) References Cited

U.S. PATENT DOCUMENTS

| | | | | |
|---|---|---|---|---|
| 8,879,558 B1* | 11/2014 | Rijsman | ................. | H04L 41/142 370/398 |
| 9,497,136 B1* | 11/2016 | Ramarao | ............. | H04L 41/5009 |
| 9,594,546 B1* | 3/2017 | Todd | ................... | H04L 67/1097 |
| 9,641,399 B1* | 5/2017 | Makrucki | ............. | H04L 43/062 |
| 10,440,153 B1* | 10/2019 | Smith | ..................... | H04L 67/34 |
| 10,728,085 B1* | 7/2020 | Chen | ........................ | H04L 41/16 |

(Continued)

OTHER PUBLICATIONS

AI Cuts IT Problems at Fannie Mae by a Third AI Cuts IT Problems at Fannie Mae by a Third—Jared Council, Dated Oct. 22, 2019, 4-Pages.

*Primary Examiner* — Lance Leonard Barry
(74) *Attorney, Agent, or Firm* — Foley & Lardner LLP

(57) ABSTRACT

Disclosed herein are systems, methods, and computer-readable media for enterprise information technology (IT) monitoring. In an embodiment, a method includes collecting system performance data for an enterprise computing environment. The method includes generating at least one cross-stack monitor schema. The cross-stack monitor schema includes at least one of shared services performance data, middleware performance data and infrastructure performance data corresponding to a particular application. The cross-stack monitor schema includes a technology stack component descriptor and a performance parameter. The technology stack component descriptor is identified based on applying reference data to the system performance data. The performance parameter is generated and populated based on the system performance data. The cross-stack monitor schema is linked to an electronic dashboard.

12 Claims, 11 Drawing Sheets

(56) References Cited

U.S. PATENT DOCUMENTS

| | | | | |
|---|---|---|---|---|
| 10,936,643 | B1* | 3/2021 | Alspaugh | G06F 16/9024 |
| 11,032,168 | B2* | 6/2021 | Ramalingam | H04L 41/0681 |
| 2010/0332645 | A1* | 12/2010 | Duggan | H04L 41/22 709/224 |
| 2011/0231582 | A1* | 9/2011 | Uysal | G06F 11/008 710/15 |
| 2014/0078882 | A1* | 3/2014 | Maltz | H04L 41/147 370/216 |
| 2014/0101731 | A1* | 4/2014 | Dandu | G06F 21/6263 726/5 |
| 2015/0058679 | A1* | 2/2015 | Jackson | G06F 9/44552 714/47.2 |
| 2015/0149609 | A1* | 5/2015 | Zou | H04L 41/065 709/224 |
| 2016/0285707 | A1* | 9/2016 | Pawlowski | H04L 67/22 |
| 2016/0301584 | A1* | 10/2016 | Gehl | H04L 43/0876 |
| 2017/0102861 | A1* | 4/2017 | Redenbach | G06F 3/14 |
| 2018/0131574 | A1* | 5/2018 | Jacobs | G06F 8/65 |
| 2018/0373558 | A1* | 12/2018 | Chang | H04L 12/4641 |
| 2019/0132381 | A1* | 5/2019 | Momchilov | G06F 3/14 |
| 2019/0384858 | A1* | 12/2019 | Yalakanti | G06F 16/9032 |
| 2020/0364101 | A1* | 11/2020 | Bottomley | G06F 21/6218 |
| 2021/0004409 | A1* | 1/2021 | Zamora Duran | H04L 67/12 |

* cited by examiner

FIG. 10

SYSTEMS AND METHODS FOR ENTERPRISE INFORMATION TECHNOLOGY (IT) MONITORING

CROSS-REFERENCE TO RELATED PATENT APPLICATIONS

This application claims priority from U.S. Provisional Application 62/927,579, filed Oct. 29, 2019, incorporated herein by reference in its entirety.

TECHNICAL FIELD

The present disclosure relates generally to systems, methods and computer-readable media for enterprise information technology monitoring—for example, in loan purchasing, processing, and administration systems. Some aspects relate to systems, methods, and computer-readable media for artificial intelligence (AI)-based enterprise monitoring and self-correction. Some aspects relate to systems, methods, and computer-readable media for unified component monitoring across technology stacks in an enterprise system. The enterprise system may include cloud-based components and on-premise components. The enterprise system may be structured to monitor the performance of financial systems, financial applications, financial data interchange interfaces, etc.

SUMMARY

In loan purchasing, processing, and administration ecosystems (e.g., for mortgage loans sold on the secondary market), entities may use electronic data interchange (EDI) systems and methods to receive, process, and transmit large amounts of data. Monitoring, troubleshooting and optimizing the infrastructure that underlies the EDI framework(s) is facilitated by systems, methods, and computer-readable media for enterprise IT monitoring, which are described herein.

Some embodiments include systems, methods and computer-readable media for transaction-based monitoring and self-correction across technology stacks. For example, a cross-stack monitor schema may include application-level components (e.g., those identified by analyzing application-level function calls), middleware-level components (e.g., those identified using web server-level monitoring), shared services components (e.g., those identified using operating system-level monitoring), and physical components (e.g., those identified using physical infrastructure monitoring). A cross-stack system health monitor may further include data pertaining to inbound and/or outbound actors such that health monitors for operations that involve different actors are distinguishable even when the technical components involved are the same.

In some embodiments, a method includes collecting (e.g., receiving, receiving in response to a query), by a processing circuit comprising computer-executable instructions executed by a processor of a computing device, system performance data for an enterprise computing environment. The method includes generating at least one cross-stack monitor schema that includes a technology stack component descriptor and a performance parameter. Generating the at least one cross-stack monitor schema includes, based on applying reference data to the system performance data, identifying a technology stack component (e.g., a particular server, database, operating system instance, network device, etc.); based on the system performance data, generating the performance parameter for the technology stack component; populating the technology stack component descriptor based on the reference data; and populating the performance parameter corresponding to the technology stack component descriptor with at least a subset of the system performance data. The method includes linking, by an electronic dashboard circuit, the at least one cross-stack monitor schema to an electronic dashboard. The electronic dashboard is accessible via a user interface of an administrator computing device.

In some embodiments, the at least one cross-stack monitor schema includes application performance data, such as application traffic (bytes in/out), uptime for a particular time period (e.g., day, week, month, annualized), response time in milliseconds, error percentage or count for 401 errors, 403 errors, 4xx errors, 5xx errors, 6xx errors, etc., and/or transaction information, including error breakdown (e.g., transaction completion code, error message, count of instances).

In some embodiments, the at least one cross-stack monitor schema further includes at least one of shared services performance data, middleware performance data and infrastructure performance data corresponding to the application performance data. For example, performance data provided in the examples above, can correspond to a particular operating system instance, a particular web server, a particular server (e.g., file, database, email), a particular network device, etc. In some embodiments, the method includes collecting reference data corresponding to the particular application and, based on the reference data, determining the at least one of the shared services performance data, the middleware performance data and the infrastructure performance data.

In some embodiments, the method includes identifying a particular application based on the system performance data. For example, an application name, instance identifier, execution path, installation directory, etc. can be parsed out from the system performance data. System performance data can include monitored function calls. In some embodiments, the method includes determining an application-level function call path for at least one function call corresponding to the particular application. The at least one function call path is representative of a particular transaction (e.g., an instance of receiving data from a partner loan servicer or lender, an instance of sending data to a partner loan servicer or lender, an instance of detecting and responding to a user interaction via a particular application in loan processing systems). Based on an execution length of the at least one function call in the application-level function call path, the method includes determining a transaction length of the particular transaction. When the transaction length exceeds a predetermined threshold, the method includes determining the at least one of the shared services performance data, the middleware performance data and the infrastructure performance data for the particular application, generating an alert related to at least one of the particular application, the shared services performance data, the middleware performance data and the infrastructure performance data, and displaying the alert via the electronic dashboard.

In some embodiments, the method includes generating a remediation recommendation corresponding to the alert. The remediation recommendation can include a reference (unique identifier, name, installation path, URL) to the at least one of the particular application, the shared services performance data, the middleware performance data and the infrastructure performance data.

Some embodiments include systems, methods and computer-readable media that enable system self-correction.

Accordingly, some embodiments include systems, methods and computer-readable media to generate and transmit a recommendation and/or an operating command, generated based on AI-based analysis of performance data, to modify default behavior of the affected system components (e.g., to shut down components, to activate components, to fail over components, to block users, to terminate CPU processes, etc.) in order to remediate the identified problem.

Some embodiments relate to a method for system self-correction across an enterprise technology stack. The method includes identifying a system performance issue related to a particular application. The method includes, based on reference data for the particular application, determining at least one of a shared services component, a middleware component and an infrastructure component corresponding to the particular application. The method includes receiving system performance data corresponding to the at least one of the shared services component, the middleware component and the infrastructure component. The method includes, based on the system performance data, identifying an underperforming component from among the at least one of the shared services component, the middleware component and the infrastructure component. The method includes generating a remediation recommendation corresponding to the underperforming component. In some embodiments, the system performance issue relates to a timing of a particular process executed by the particular application. In some embodiments, the underperforming component comprises at least one of a web server, a file server, a database server, an operating system-executed process, and a network device. In some embodiments, the method includes performing a system action on the underperforming component. In some embodiments, the method includes deactivating the underperforming component. In some embodiments, the method includes terminating a system process associated with a particular user.

Some embodiments include systems, methods and computer-readable media for data analytics, drill-down, and performance monitoring via an electronic dashboard. Accordingly, some embodiments relate to a computer-readable medium (CRM) comprising computer-executable instructions stored thereon that, when executed by at least one processor, cause the at least one processor to perform various operations. The operations include generating a cross-stack monitor schema comprising system performance information related to a particular application and at least one of a shared services component, a middleware component and an infrastructure component corresponding to the particular application. The at least one of the shared services component, the middleware component and the infrastructure component is identified based on monitoring function calls of the particular application. The operations include retrieving system performance information from the cross-stack monitor schema. The operations include generating an electronic dashboard comprising the system performance information. The operations include causing the electronic dashboard to be displayed on a display of a computing device.

In some embodiments, the system performance information includes a system health category. In some embodiments, the system performance information includes a performance score. In some embodiments, the system performance information displayed on the electronic dashboard comprises a plurality of nodes, each of the plurality of nodes corresponding to a system component associated with the particular application.

In some embodiments, the operations include determining a first user entity associated with the particular application, determining a second user entity associated with the particular application, generating first system performance information corresponding to the first user entity and second system performance information corresponding to the second user entity, and causing the electronic dashboard to display the first system performance information and the second system performance information. In some embodiments, the first user entity is an inbound data source or an outbound data source. In some embodiments, the first user entity is a particular business unit.

It should be appreciated that all combinations of the foregoing concepts and additional concepts discussed in greater detail below (provided such concepts are not mutually inconsistent) are contemplated as being part of the subject matter disclosed herein. In particular, all combinations of claimed subject matter appearing at the end of this disclosure are contemplated as being part of the subject matter disclosed herein.

The foregoing and other features of the present disclosure will become more fully apparent from the following description and appended claims, taken in conjunction with the accompanying drawings. Understanding that these drawings depict only several implementations in accordance with the disclosure and are therefore not to be considered limiting of its scope, the disclosure will be described with additional specificity and detail through use of the accompanying drawings.

These and other advantages and features of the systems and methods described herein, together with the organization and manner of operation thereof, will become apparent from the following detailed description when taken in conjunction with the accompanying drawings.

BRIEF DESCRIPTION OF THE FIGURES

FIG. 10 is an example user interface diagram showing a drill-down view for the cross-stack monitor schema, according to an example embodiment.

DETAILED DESCRIPTION

Referring to the figures generally, systems, methods and computer-readable media for enterprise IT monitoring are disclosed.

Managing information technology is more complex and challenging than ever before, with many enterprise systems moving towards a hybrid cloud environment utilizing a mix of multi-cloud service offerings (Azure, Amazon AWS, Salesforce, etc.) and on-premise solutions. Such environments present the need for enhanced monitoring capabilities to facilitate a transparent IT environment that is easy to manage. Systems, methods and computer-readable media of the present disclosure encompass a holistic monitoring ecosystem that captures the availability, health, and performance of an entire technology stack across both on-premise and cloud systems. The benefits include deeper insights into application, platform performance, and customer experience; smart dashboards with drill-down capabilities for quicker troubleshooting, leading to lower mean time to detect (MTTD) and mean time to respond (MTTR); and more unified IT teams, better collaboration, and higher operational efficiencies.

Systems, methods, and computer-readable media of the present disclosure may utilize artificial intelligence (AI) and, more specifically, machine learning (ML). Some of the ways in which AI and ML are contributing in the enterprise monitoring space include real-time insights into health and performance of a technology stack. Additionally, AI may be implemented in a recommender module that suggests resolution steps based on past similar incidents and performs self-healing through automation for recurring incidents. Additionally, AI may be used to correlate anomalies to create unique situations and identifies potential cause and impact for anomalies.

Disclosed herein are systems, methods, and computer-readable media for enterprise information technology (IT) monitoring and/or performing automated system actions for error remediation. As described herein, an example monitor schema may include information about a computer application and its underlying supporting virtual and physical infrastructure, such as shared services, middleware, physical infrastructure components (e.g., network devices as described herein) and the like. In operation, a particular application may be identified. A particular long-running process executed by the application or associated with the execution of the application may be identified based on monitoring the function calls made in the course of executing the application. Cross-reference data (e.g., from change management databases, asset tracking databases, etc.) may be used to supplement monitoring data in order to identify particular components within the application's underlying infrastructure. Performance of the various particular components can be optimized via automatic remediation actions.

Figure 1:
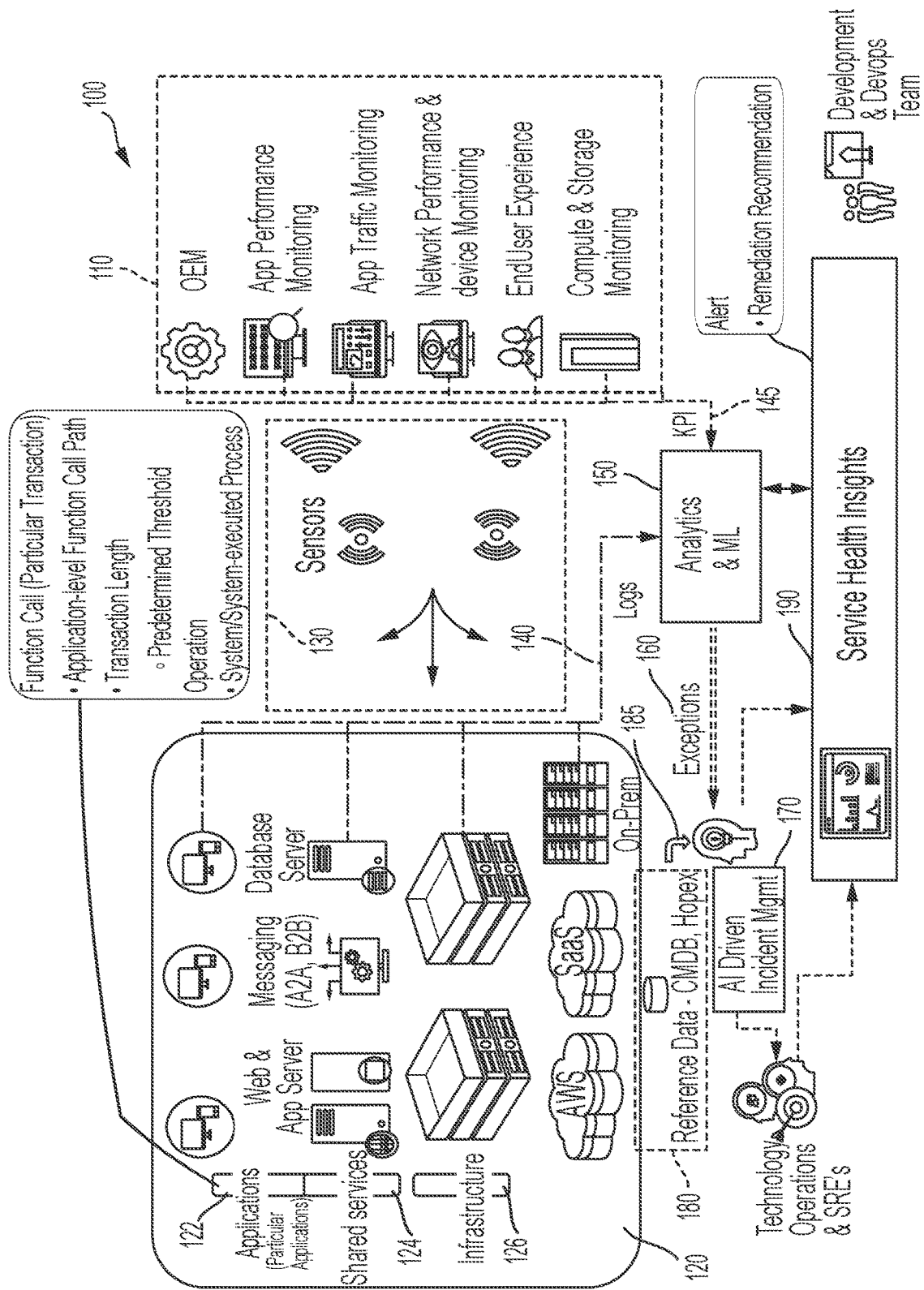
FIG. 1 is a block diagram of a system for enterprise IT monitoring, according to an example embodiment.

Referring now to FIG. 1, a block diagram of a system for enterprise IT monitoring is shown, according to an example embodiment. As shown, an enterprise IT monitoring system 100 includes one or more system monitoring circuits 110. The one or more system monitoring circuits 110 can include various monitoring orchestrators 130, such as computer-executable modules, logical sensors, and/or physical sensors for monitoring the status of various components within the enterprise infrastructure 120, such as applications 122, shared services 124, middleware (not shown) and infrastructure 126. The monitoring orchestrators 130 are structured to collect system performance data 140 regarding various aspects of the enterprise infrastructure 120. Examples of system performance data 140 can include operating system performance data, web server performance data, application performance monitoring data, application traffic data, network performance data, device monitoring data, end user experience data, computer storage monitoring data, CPU monitoring data, etc. More generally, system performance data 140 may relate to at least one of the application-level, middleware-level, shared services-level and infrastructure-level components of the enterprise infrastructure 120.

As shown, an enterprise IT monitoring system 100 includes a technology stack management circuit 150. In some embodiments, the technology stack management circuit 150 includes the incident management circuit 170. The technology stack management circuit 150 is structured to receive the system performance data 140 and apply analytics and machine learning techniques to derive transaction-based and/or cross-stack performance information. In some embodiments, the technology stack management circuit 150 is structured to receive additional key performance indicator data 145 from the system monitoring circuits 110 and augment system performance data with this information.

In some embodiments, the technology stack management circuit 150 is structured to receive reference data 185 from a reference data management system 180 (e.g., a change management system, a feature set management system, etc.) and derive transaction-based and/or cross-stack performance information from the reference data 185. For example, reference data 185 received from a change management system can include application-to-CMDB mapping data that links applications 122 to infrastructure 126. Reference data 185 received from the feature set management system may include application feature set mapping data that links components of applications 122 to end user workflows and/or related business processes. The technology stack management circuit 150 may be structured to derive cross-stack performance information from this data. For example, the technology stack management circuit 150 may monitor application-level function calls for one or more applications 122 to construct a function call path, which may be representative of transaction information. The technology stack management circuit 150 may compute the length of the transaction using the combined or beginning-to-end execution length of functions included in the function call path as a proxy. If the length of the transaction exceeds a predetermined threshold (e.g., 10 milliseconds, 50 milliseconds, 500 milliseconds, 1000 milliseconds, 5000 milliseconds, 10 seconds, 30 seconds, 1 minute, 5 minutes, etc. and/or as defined by KPI data 145), the technology stack management circuit 150 may use the reference data 185 to identify the underlying shared services 124 and/or infrastructure components 126 and analyze the system performance data 140 for these components to determine the root cause of the slowdown.

As another example, the technology stack management circuit 150 may be structured to integrate infrastructure-level monitoring, platform level and application level monitoring in cloud-based environments. Traditionally, these monitoring aspects may be performed by different parties who do not share data (e.g., the resource provider may monitor the infrastructure that supports virtualized environments, each used by a different resource consumer, and a particular resource consumer may monitor the operating system performance in a particular virtualized environment).

The technology stack management circuit 150 is structured to generate a cross-stack monitor schema 160, which may include a plurality of technology stack component descriptors and a plurality of performance parameters. The cross-stack monitor schema 160 corresponds to a transaction-level and/or cross-stack performance data set. For example, a particular cross-stack system health monitor may correspond to a cross-stack transaction. In the cross-stack transaction, a particular business partner may provide a data feed (e.g., a loan-related data feed for purchased loans). A transaction or a subset of transactions may be identified that correspond to the particular business partner. An application 122 may import the data using a web server. The application 122 may save the data in a database server. A transaction length may be calculated to include execution time for computer-based operations from the point a data feed was received, to the point the entirety of the data set was written to storage media managed by the database server. The technology stack component descriptors may include identifying information for each of the application 122, the web server, the database server, related network traffic, the storage media, etc. For each of the technology stack component descriptors, the cross-stack monitor schema 160 may include one or more performance parameters populated based on system performance data 140 collected by the monitoring orchestrators 130 for each of the corresponding components of enterprise IT.

The technology stack management circuit 150 may be structured to link to the electronic dashboard 190. The dashboard 190 may support data analytics, drill-down, and performance monitoring by administrators, such as development teams, technology operations teams, etc.

Figure 2:
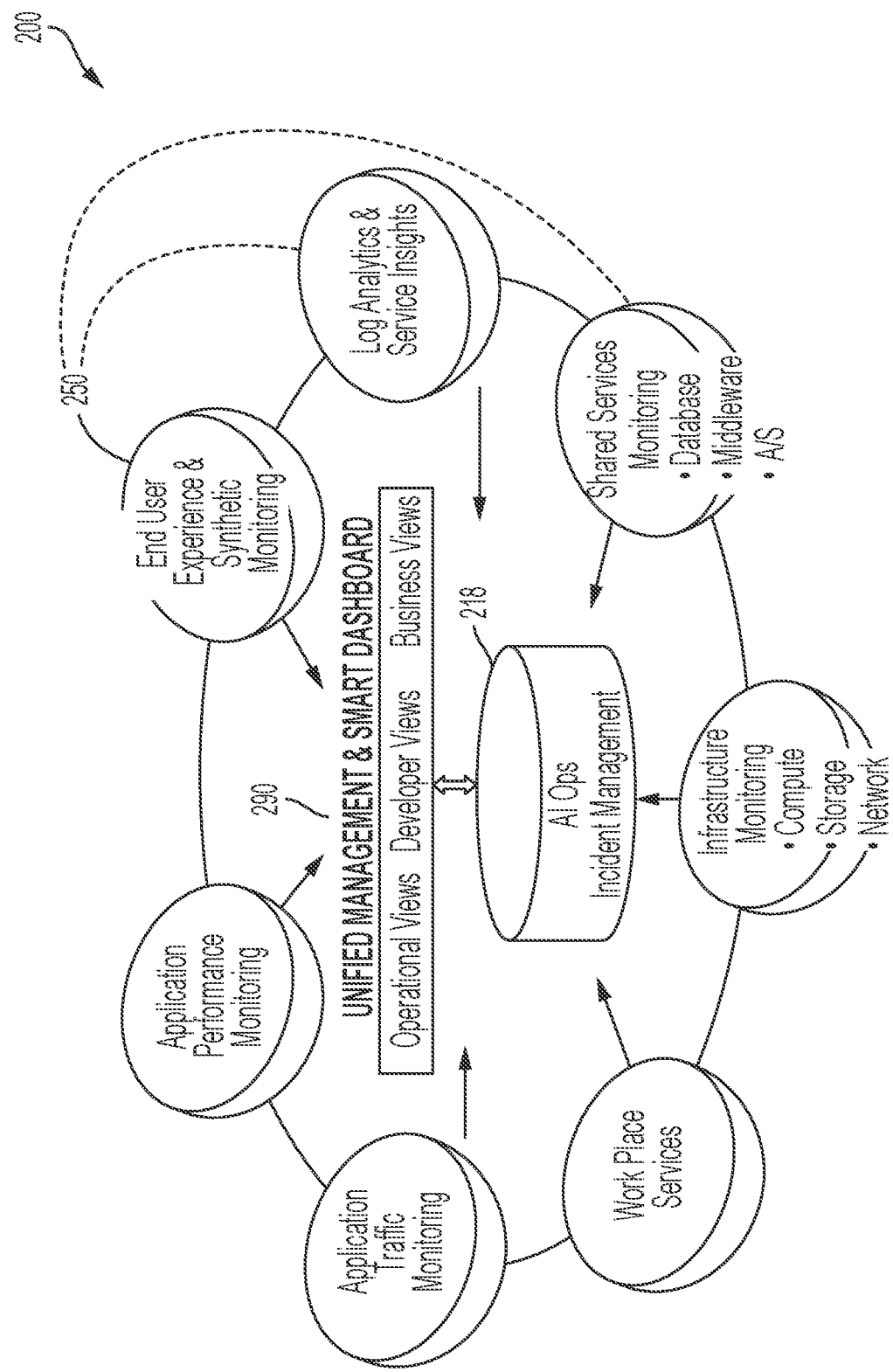
FIG. 2 is a decomposition diagram of the system for enterprise IT monitoring, according to an example embodiment.

Referring now to FIG. 2, a decomposition diagram of the system for enterprise IT monitoring 200 is shown, according to an example embodiment. The decomposition diagram shows different monitoring operations 250 of an enterprise IT. According to various embodiments, the monitoring operations 250 may include computer-executable code that, when executed by a processor of a computing system, such as that of FIG. 3, performs the operations. The monitoring operations 250 may be performed by or with any of system monitoring circuits 110, enterprise infrastructure 120, monitoring orchestrators 130, and technology stack management circuit 150 shown in FIG. 1, etc. The outputs of the monitoring operations 218 (e.g., cross-stack monitor schemas 160 populated with data) may be stored in a data store 218 and/or provided to the dashboard 290.

The monitoring operations 218 may include circuits structured to receive and decode data (such as system performance data 140) from suitable systems currently on the market.

Figure 3:
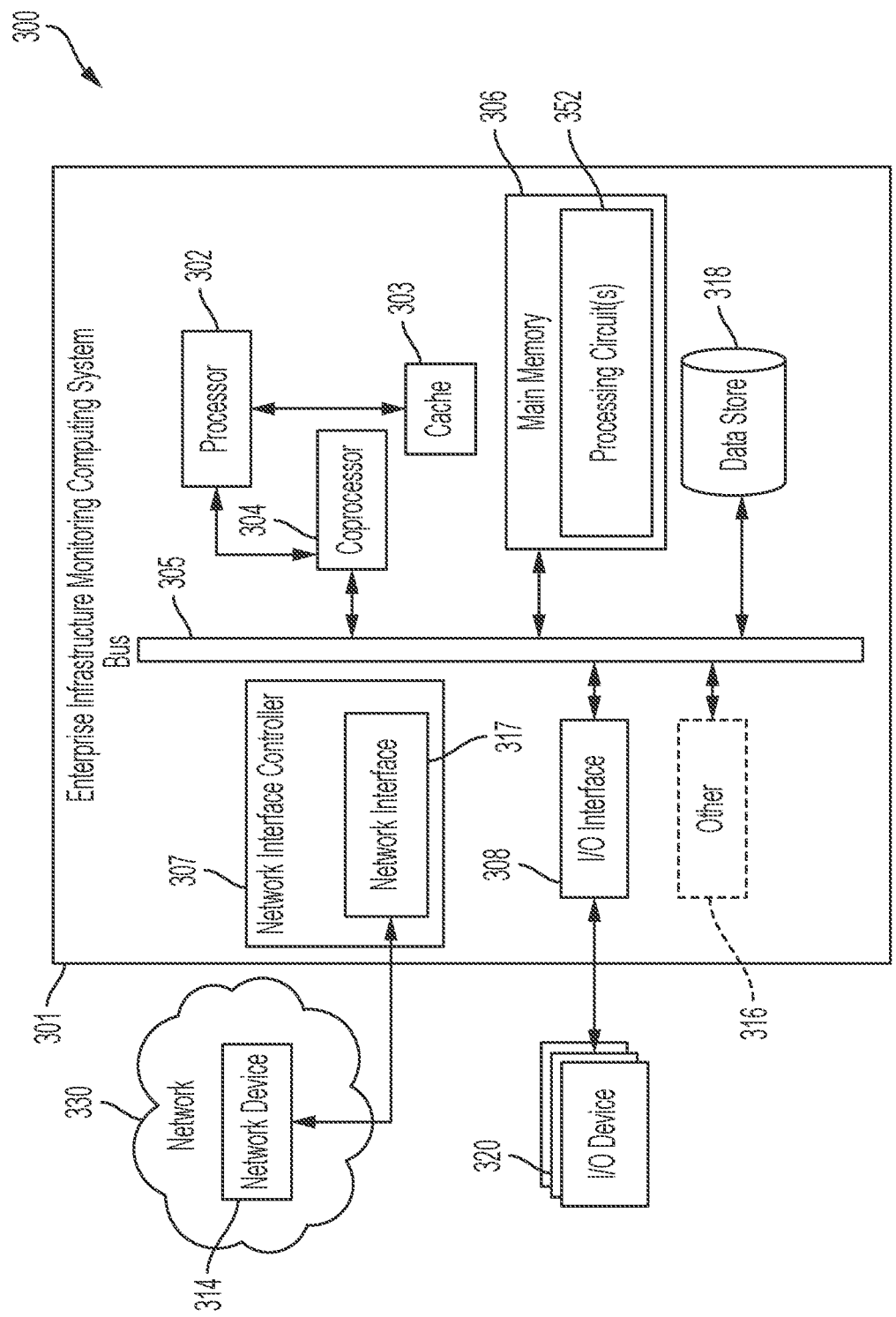
FIG. 3 is a block diagram of an example computing system structured to perform enterprise IT monitoring operations, according to an example embodiment.

Referring now to FIG. 3, a block diagram 300 of an example enterprise infrastructure monitoring computing system 301 is shown, according to an example embodiment. The enterprise infrastructure monitoring computing system 301 is suitable for use in implementing the computerized components described herein, in accordance with an illustrative implementation. In broad overview, the enterprise infrastructure monitoring computing system 301 includes a processor 302 for performing actions in accordance with instructions, e.g., instructions held in cache memory 303. The illustrated example enterprise infrastructure monitoring computing system 301 includes one or more processors 302 and coprocessors 304 in communication, via a bus 305, with main memory 306 comprising computer-executable code embodying the processing circuit 352, a network interface controller 307, an input/output (I/O) interface 308, and a data store 318, etc. In some implementations, the enterprise infrastructure monitoring computing system 301 may include additional interfaces or other components 316.

As shown, the main memory 306 includes the processing circuit 352, which may be structured to perform the functions described in relation to FIG. 1 and FIG. 2. One of skill will appreciate that various arrangements suitable for practicing the principles disclosed herein are within the scope of the present disclosure.

In some implementations, a processor 302 can be configured to load instructions from the main memory 306 (or from data storage) into cache memory 303. Furthermore, the processor 302 can be configured to load instructions from cache memory 303 into onboard registers and execute instructions from the onboard registers. In some implementations, instructions are encoded in and read from a read-only memory (ROM) or from a firmware memory chip (e.g., storing instructions for a Basic I/O System (BIOS)), not shown.

As shown, the processor 302 is connected to the cache memory 303. However, in some implementations, the cache memory 303 is integrated into the processor 302 and/or implemented on the same circuit or chip as the processor 302. Some implementations include multiple layers or levels of cache memory 303, each further removed from the processor 302. Some implementations include multiple processors 302 and/or coprocessors 304 that augment the processor 302 with support for additional specialized instructions (e.g., a math coprocessor, a floating point coprocessor, and/or a graphics coprocessor). As shown, the coprocessor 304 is closely connected to the processor 302. However, in some implementations, the coprocessor 304 is integrated into the processor 302 or implemented on the same circuit or chip as the processor 302. In some implementations, the coprocessor 304 is further removed from the processor 302, e.g., connected to the bus 305.

The network interface controller 307 can be configured to control one or more network interfaces 317 for connection to network devices 314 (e.g., for access to a network 330). The I/O interface 308 can be configured to facilitate sending and receiving data to various I/O devices 320 such as, but not limited to, keyboards, touch screens, microphones, motion sensors, video displays, speakers, haptic feedback devices, printers, and so forth. In some implementations, one or more of the I/O devices 320 are integrated into the enterprise infrastructure monitoring computing system 301. In some implementations, one or more of the I/O devices 320 are external to, and separable from, the enterprise infrastructure monitoring computing system 301.

In some implementations, the enterprise infrastructure monitoring computing system 301 is implemented using special purpose logic circuitry, e.g., an application-specific integrated circuit (ASIC) or a system on a chip (SoC) semiconductor device that includes the processor 302 and one or more additional components, e.g., the cache memory 303, network interface controller 307 and network interface 317, and one or more I/O interfaces 308.

The processors 302 can be any logic circuitry that processes instructions, e.g., instructions fetched from the cache memory 303, main memory 306, data store 318 or other memory not shown. The processor 302 includes a number of data and instruction registers. In some implementations, on start-up (boot), the processor 302 can be configured to load initial instructions from a BIOS into the registers, including instructions for loading more instructions, and execute instructions from the registers. In some implementations, the BIOS instructions cause the processor 302 to load an operating system (OS), which in turn causes the processor 302 to load and execute one or more programs.

The processors 302 may be augmented by one or more ancillary coprocessors 304, which are auxiliary processing units with specialized instruction sets for specific purposes. In some implementations, the processor 302 faced with an unrecognized instruction will pass the instruction to the coprocessor 304, e.g., via a special bus, and only generate an un-recognized instruction fault if the coprocessor 304 also does not recognize the instruction. The processors 302 and coprocessors 304 may each be single-core or multi-core processor(s).

The enterprise infrastructure monitoring computing system 301 may include multiple distinct processors 302 and/or multiple distinct coprocessors 304. For example, in some implementations, a general purpose processor 302 such as a multi-core central processing unit (CPU) may be augmented with one or more special purpose coprocessors 304, such as a math coprocessor, floating point coprocessor, or a graphics processing unit (GPU). For example, a math coprocessor 304 can assist the processor 302 with high precision or complex calculations. In some implementations, the processor(s) 302 and coprocessors 304 are implemented as circuitry on one or more chips. The enterprise infrastructure monitoring computing system 301 may be based on any processor 302, or set of processors 302 and/or coprocessors 304, capable of operating as described herein.

The cache memory 303 is generally a form of computer memory placed in close proximity to a processor 302 for fast access times. In some implementations, the cache memory 303 is memory circuitry that is part of, or on the same chip as, a processor 302. In some implementations, there are multiple levels of cache memory 303, e.g., L2 and L3 cache layers. In some implementations, multiple processors 302, and/or multiple cores of a processor 302, share access to the same cache memory 303.

The main memory 306 may be any device suitable for storing computer readable data. The main memory 306 is a device that supports direct access to specified addresses; i.e., the main memory 306 is random access memory (RAM). In some implementations, the main memory 306 is a volatile semiconductor memory device such as dynamic random-access memory (DRAM), synchronous dynamic random-access memory (SDRAM), double data rate SDRAM (DDR SDRAM), static random-access memory (SRAM), T-RAM, Z-RAM, and so forth. The enterprise infrastructure monitoring computing system 301 may have any number of devices serving as main memory 306.

Still referring to FIG. 3, the bus 305 is an interface that provides for data exchange between the various internal components of the enterprise infrastructure monitoring computing system 301, e.g., connecting the processor 302 to the main memory 306, the network interface controller 307, the I/O interface 308, and data store 318. In some implementations, the bus 305 further provides for data exchange with one or more components external to the enterprise infrastructure monitoring computing system 301, e.g., other components 316. In some implementations, the bus 305 includes serial and/or parallel communication links. In some implementations, the bus 305 implements a data bus standard such as integrated drive electronics (IDE), peripheral component interconnect express (PCI), small computer system interface (SCSI), or universal serial bus (USB). In some implementations, the enterprise infrastructure monitoring computing system 301 has multiple busses 305.

The enterprise infrastructure monitoring computing system 301 may include, or provide interfaces 308 for, one or more input or output (I/O) devices 320. The I/O devices 320 include input devices such as, without limitation, keyboards, touch screens, touchpads (e.g., electromagnetic induction pads, electrostatic pads, capacitive pads, etc.), microphones, joysticks, foot pedals, Inertial Measurement Units (IMUs), accelerometers, gyroscopes, tilt-sensors, motion sensors, environmental sensors, Musical Instrument Digital Interface (MIDI) input devices such as MIDI instruments (e.g., MIDI keyboards), styluses, and pointing devices such as a mouse or trackball. Output devices include, without limitation, video displays, speakers, haptic feedback devices, refreshable Braille terminals, lights, servos, MIDI output devices such as MIDI synthesizers, and two or three dimensional printers.

The network 330 enables communication between various nodes such as the enterprise infrastructure monitoring computing system 301 and a network device 314. In some implementations, data flows through the network 330 from a source node to a destination node as a flow of data packets, e.g., in the form of data packets in accordance with the Open Systems Interconnection (OSI) layers. A flow of packets may use, for example, an OSI layer-4 transport protocol such as the User Datagram Protocol (UDP), the Transmission Control Protocol (TCP), or the Stream Control Transmission Protocol (SCTP), transmitted via the network 330 layered over an OSI layer-3 network protocol such as Internet Protocol (IP), e.g., IPv4 or IPv6. The network 330 is composed of various network devices (nodes) linked together to form one or more data communication paths between participating devices. Each networked device includes at least one network interface for receiving and/or transmitting data, typically as one or more data packets. An illustrative network 330 is the Internet; however, other networks may be used. The network 330 may be an autonomous system (AS), i.e., a network that is operated under a consistent unified routing policy (or at least appears to from outside the AS network) and is generally managed by a single administrative entity (e.g., a system operator, administrator, or administrative group).

The network 330 may be composed of multiple connected sub-networks or AS networks, which may meet at one or more of: an intervening network (a transit network), a dual-homed gateway node, a point of presence (POP), an Internet eXchange Point (IXP), and/or additional other network boundaries. The network 330 can be a local-area network (LAN) such as a company intranet, a metropolitan area network (MAN), a wide area network (WAN), an inter network such as the Internet, or a peer-to-peer network, e.g., an ad hoc Wi-Fi peer-to-peer network. The data links between nodes in the network 330 may be any combination of physical links (e.g., fiber optic, mesh, coaxial, twisted-pair such as Cat-5 or Cat-6, etc.) and/or wireless links (e.g., radio, satellite, microwave, etc.).

The network 330 can include carrier networks for mobile communication devices, e.g., networks implementing wireless communication protocols such as the Global System for Mobile Communications (GSM), Code Division Multiple Access (CDMA), Time Division Synchronous Code Division Multiple Access (TD-SCDMA), Long-Term Evolution (LTE), or any other such protocol including, but not limited to, so-called generation 3G, 4G, and 5G protocols. The network 330 can include short-range wireless links, e.g., via Wi-Fi, BLUETOOTH, BLE, or ZIGBEE, sometimes referred to as a personal area network (PAN) or mesh network. The network 330 may be public, private, or a combination of public and private networks. The network 330 may be any type and/or form of data network and/or communication network.

The network interface controller 307 manages data exchanges with devices in the network 330 (e.g., the network device 314) via the network interface 317 (sometimes referred to as a network interface port). The network interface controller 307 handles the physical and data link layers of the Open Systems Interconnection (OSI) model for network communication. In some implementations, some of the network interface controller's tasks are handled by the processors 302 and/or coprocessors 304. In some implementations, the network interface controller 307 is incorporated into the processor 302, e.g., as circuitry on the same chip. In some implementations, a enterprise infrastructure monitoring computing system 301 has multiple network interfaces 317 controlled by a single controller 307. In some implementations, a enterprise infrastructure monitoring computing system 301 has multiple network interface controllers 307. In some implementations, each network interface 317 is a connection point for a physical network link (e.g., a Cat-5 Ethernet link).

In some implementations, the network interface controller 307 supports wireless network connections and an interface 317 is a wireless (e.g., radio) receiver/transmitter (e.g., for any of the IEEE 802.11 Wi-Fi protocols, near field communication (NFC), BLUETOOTH, BLUETOOTH LOW ENERGY (BLE), ZIGBEE, ANT, or any other wireless protocol). In some implementations, the network interface controller 307 implements one or more network protocols such as Ethernet. Generally, the enterprise infrastructure monitoring computing system 301 can be configured to exchange data with other computing devices via physical or wireless links through a network interface 317. The network interface 317 may link directly to another device or to another device via an intermediary device, e.g., a network device 314 such as a hub, a bridge, a switch, or a router, connecting the enterprise infrastructure monitoring computing system 301 to the network 330.

The network device 314 may be a hub, switch, router, modem, network bridge, another enterprise infrastructure monitoring computing system 301, or any other network node. In some implementations, the network device 314 is a network gateway. In some implementations, the network device 314 is a routing device implemented using customized hardware such as a special purpose processor and/or a ternary content-addressable memory (TCAM).

The other components 316 may include an alternative I/O interface, external serial device ports, and any additional coprocessors 304 that are connected via the bus 305. For example, a enterprise infrastructure monitoring computing system 301 may include an interface (e.g., a universal serial bus (USB) interface) for connecting external input devices, output devices, or additional memory devices (e.g., portable flash drive or external media drive).

The illustrated enterprise infrastructure monitoring computing system 301 is suitable for implementing systems that manage or organize data. Generally, the data store 318 described in reference to FIG. 3 may be any device suitable for storing computer readable data between power cycles. In some implementations, the data store 318 is a device with fixed storage media, such as magnetic disks, e.g., a hard disk drive (HDD). In some implementations, the data store 318 is a device with removable storage media, such as magnetic disks (e.g., a floppy disk drive or removable HDD), magnetic tape, magneto-optical disks, or optical discs (e.g., CD ROM, DVD-ROM, or BLU-RAY discs). In some implementations, the data store 318 is a non-volatile semiconductor memory device such as an erasable programmable read-only memory (EPROM), electrically erasable programmable read-only memory (EPROM), or Flash memory. In some implementations, the main memory is a solid-state drive (SSD), e.g., using multi-level cell (MLC) NAND-based Flash memory. An enterprise infrastructure monitoring computing system 301 may have any number of devices serving as data store 318.

Generally, a database, or more specifically a database management system (DBMS), organizes data in accordance with a database definition, e.g., a database schema. For example, in a relational database, the DBMS maintains data in a table-like data structure. Each table has columns, each corresponding to an entry type, classification, or purpose. For example, a table might have a column for numerical data, a column for text data (e.g., a description of the numerical data), a column for date data, and so forth. In some implementations, a column represents structured data grouping multiple data elements into a single column. In a relational database, each entry in a column in a table is also in a row associating the entry with entries from other columns in the table.

In some instances, an entry (or combination of entries) will associate a row from one table with one or more rows in another table. In some DBMS implementations, virtual tables called "views" represent data pulled from one or more tables as though it, too, were a table (that is, the view looks to a database client or user as though it was a table, but is not necessarily stored as such). Other types of database management systems can also be used, including various types of relational databases, object oriented databases, document oriented databases, eXtensible Markup Language (XML) databases, NoSQL databases, and so forth. Many of these database types use tables, or table-like structures, in a manner similar to that described above in reference to relational databases. In some database implementations, data is stored or represented in a manner other than a table, e.g., as a collection of data tuples.

A client or user of a database can add data to, modify data in, or retrieve data from the database using database instructions, e.g., queries in a database query language such as the Structured Query Language (SQL). One or more database instructions may be grouped together into a database transaction. Traditionally, a database provides transaction atomicity, consistency, isolation, and durability. These properties are known by the acronym ACID. In some implementations, a DBMS provides all of the ACID properties. However, in some implementations, the DBMS does not provide all of the ACID properties.

In some implementations, one or more clients devices, e.g., instances of the enterprise infrastructure monitoring computing system 301, are in communication with the data store 318, e.g., via a direct link or via the network 330. In some implementations, one or more of the clients obtain data from the DBMS using queries in a formal query language such as Structured Query Language (SQL), Hyper Text Structured Query Language (HTSQL), Contextual Query Language (CQL), Data Mining Extensions (DMX), or XML Query (XQuery). In some implementations, one or more of the clients obtain data from the DBMS using an inter-process communication architecture such as the Common Object Request Broker Architecture (CORBA), Remote Procedure Calls (RPC), Object Linking and Embedding (OLE), Component Object Model (COM), or Distributed Component Object Model (DCOM). In some implementations, one or more of the clients obtain data from the DBMS using natural language or semantic queries. In some implementations, one or more of the clients obtain data from the DBMS using queries in a custom query language such as a Visualization API Query Language. Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus (including, e.g., a processor 302). A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium is tangible. The computer storage medium stores data, e.g., computer executable instructions, in a non-transitory form.

Figure 6:
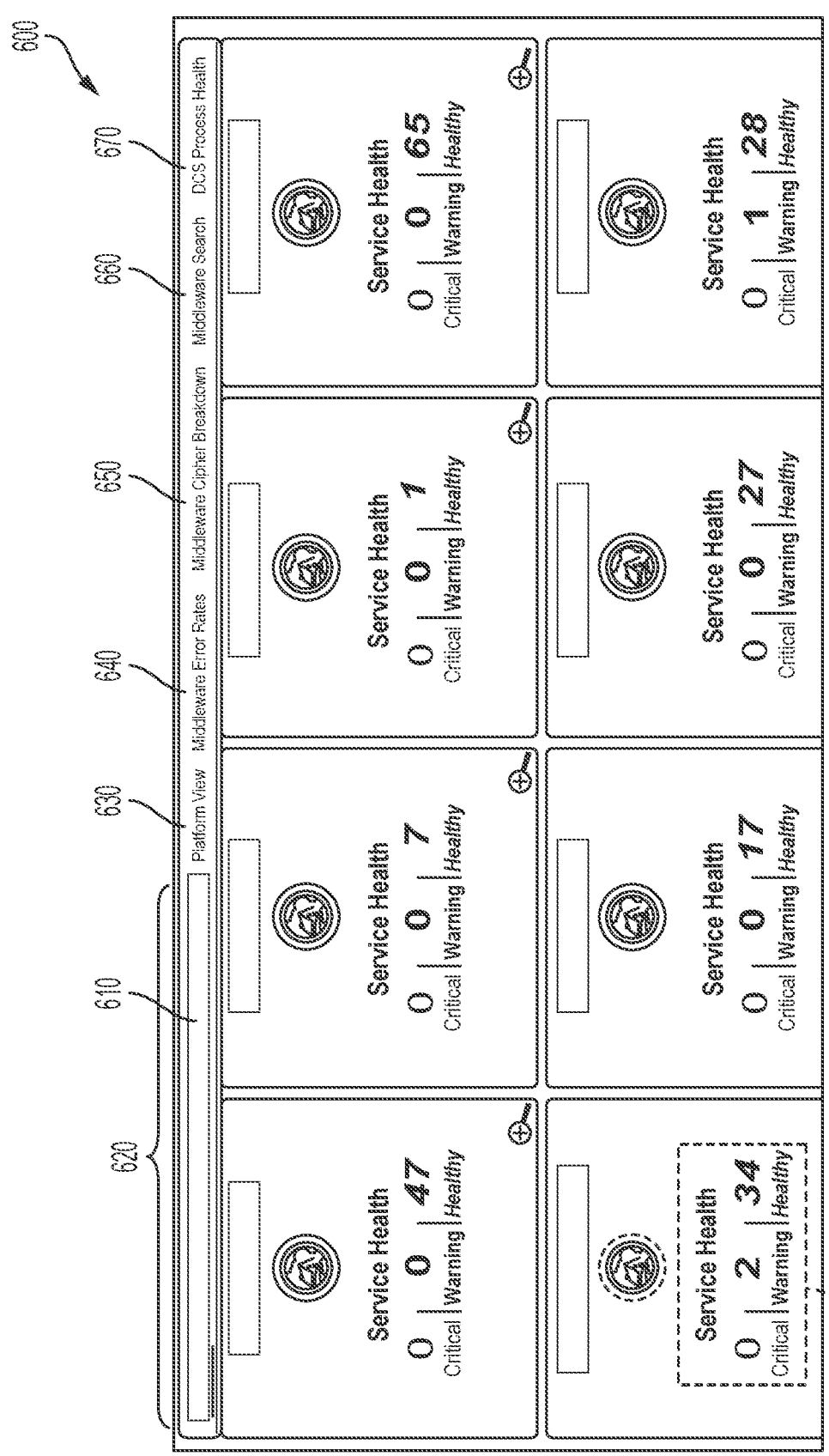
FIG. 6 is an example user interface diagram showing a middleware health dashboard for operational units within an enterprise IT, according to an example embodiment.
Figure 7:
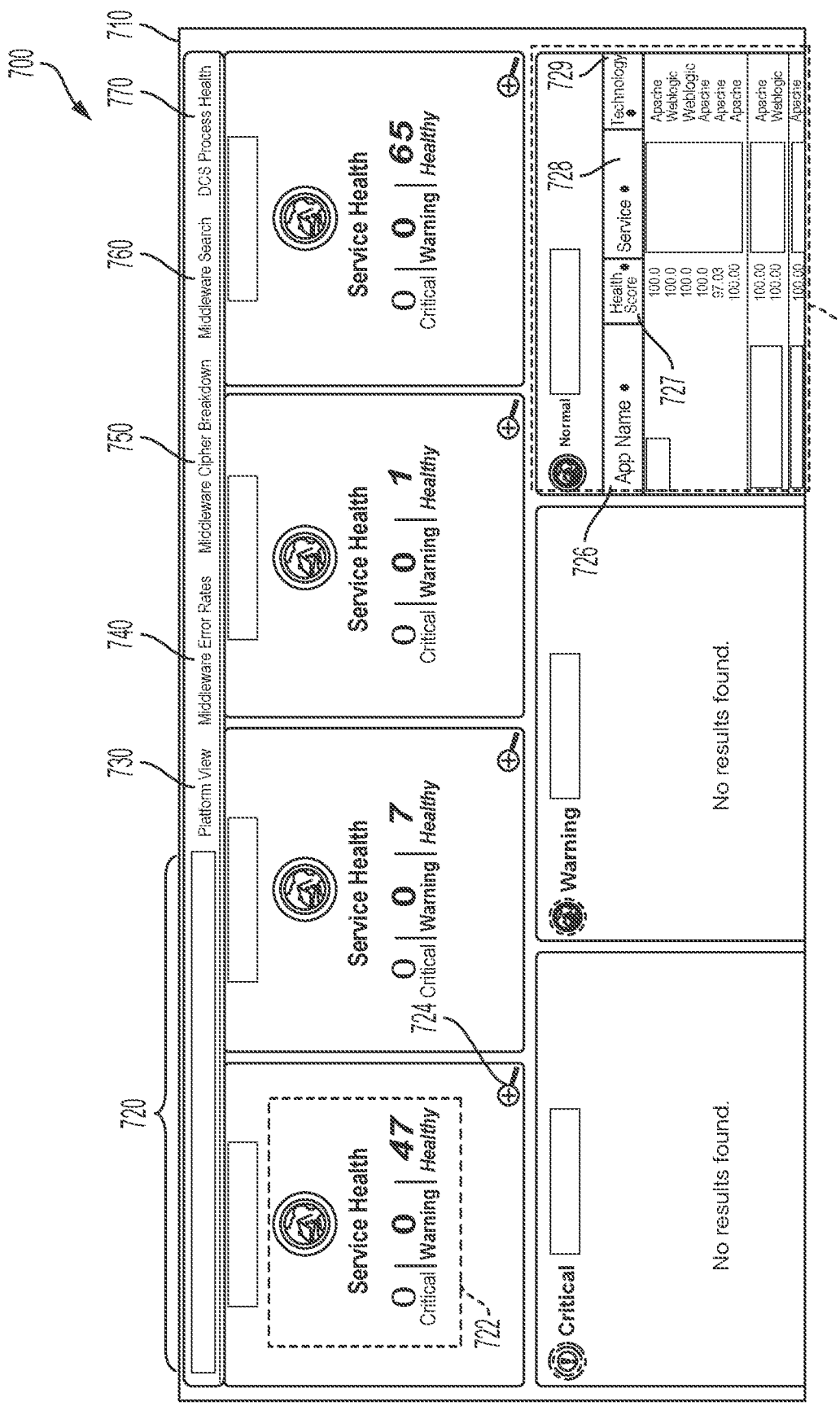
FIG. 7 is an example user interface diagram showing a drill-down view of a middleware health dashboard, according to an example embodiment.
Figure 8:
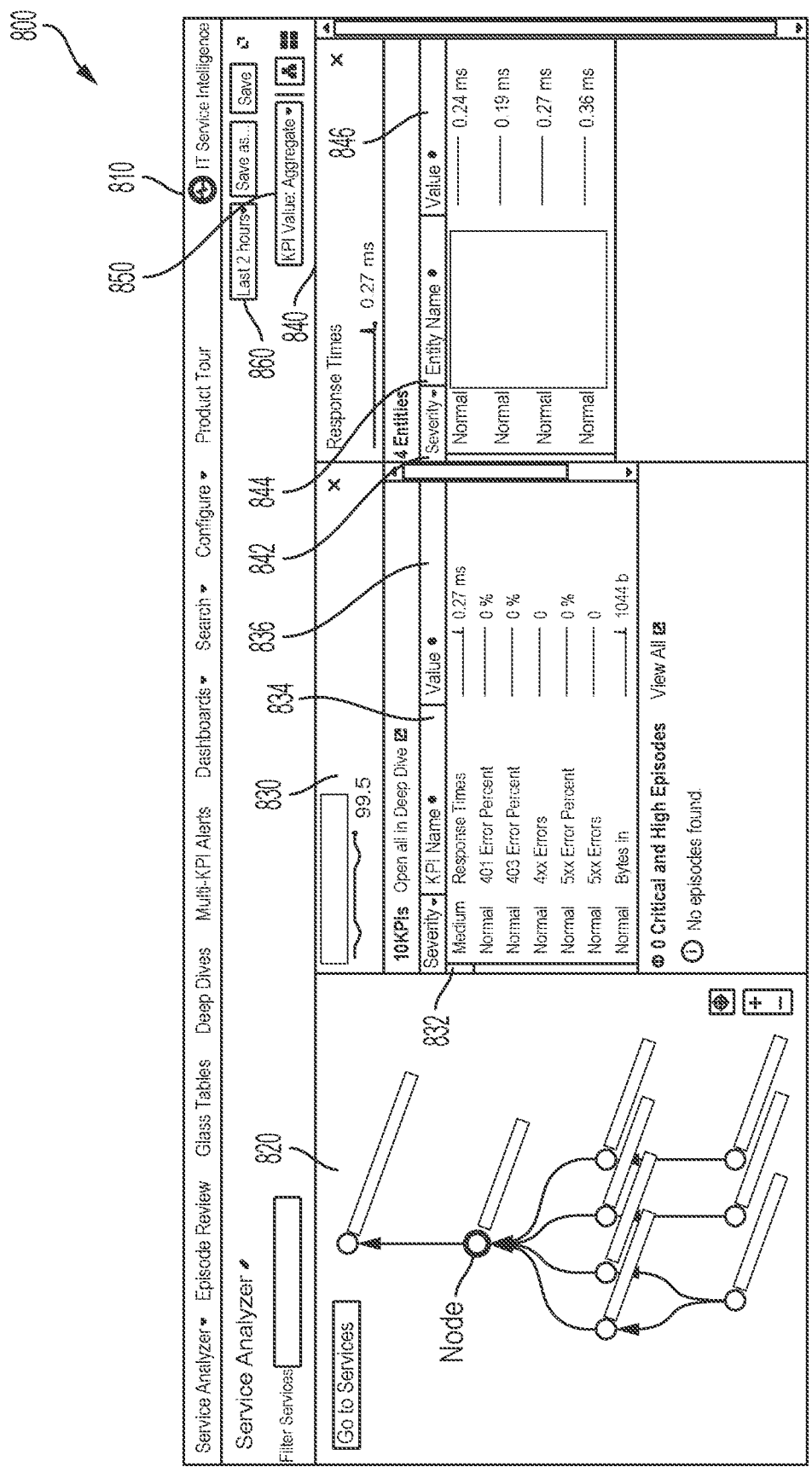
FIG. 8 is an example user interface diagram showing server-level drill-down of a middleware health dashboard, according to an example embodiment.
Figure 9:
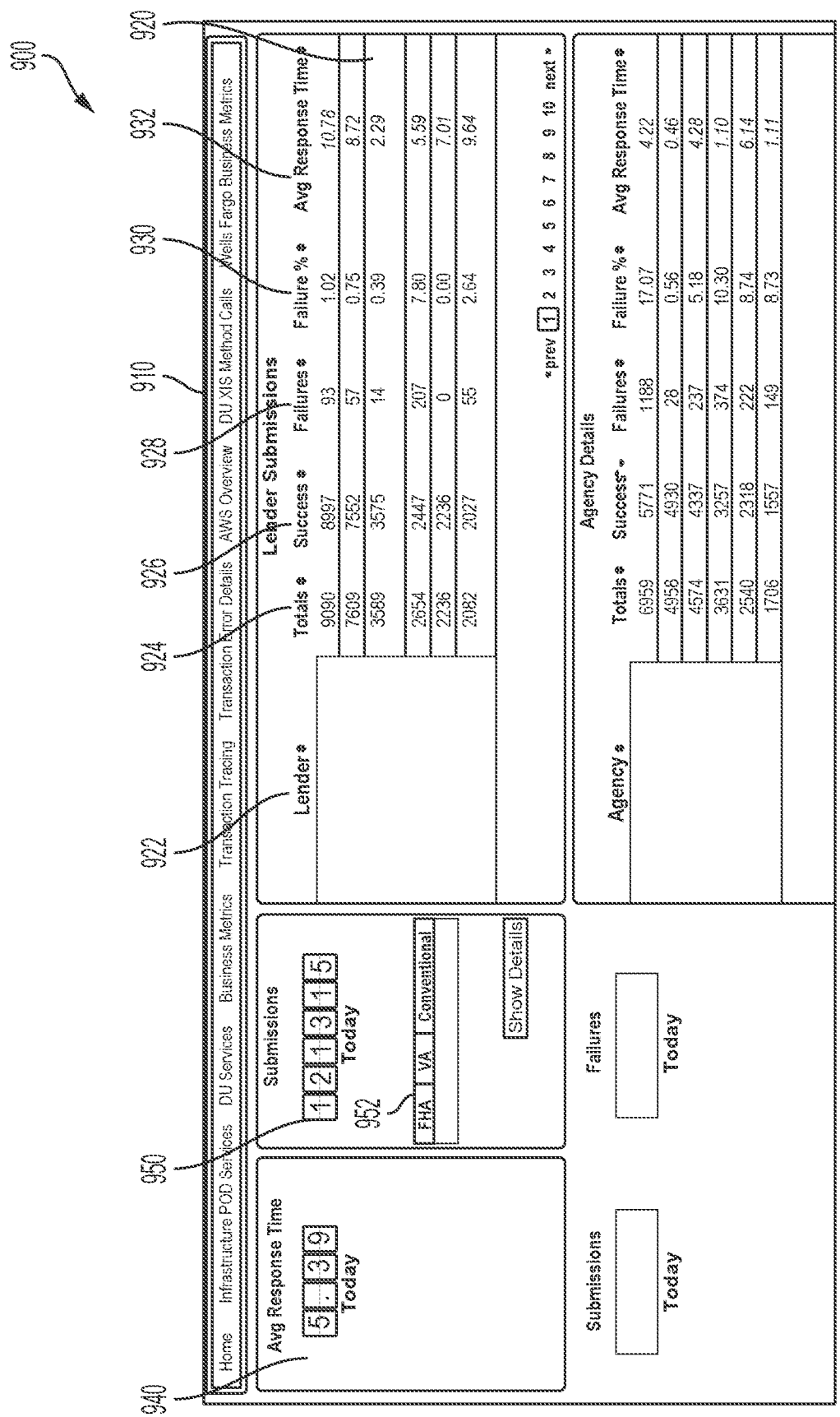
FIG. 9 is an example user interface diagram showing a cross-stack monitor schema, according to an example embodiment.
Figure 10:
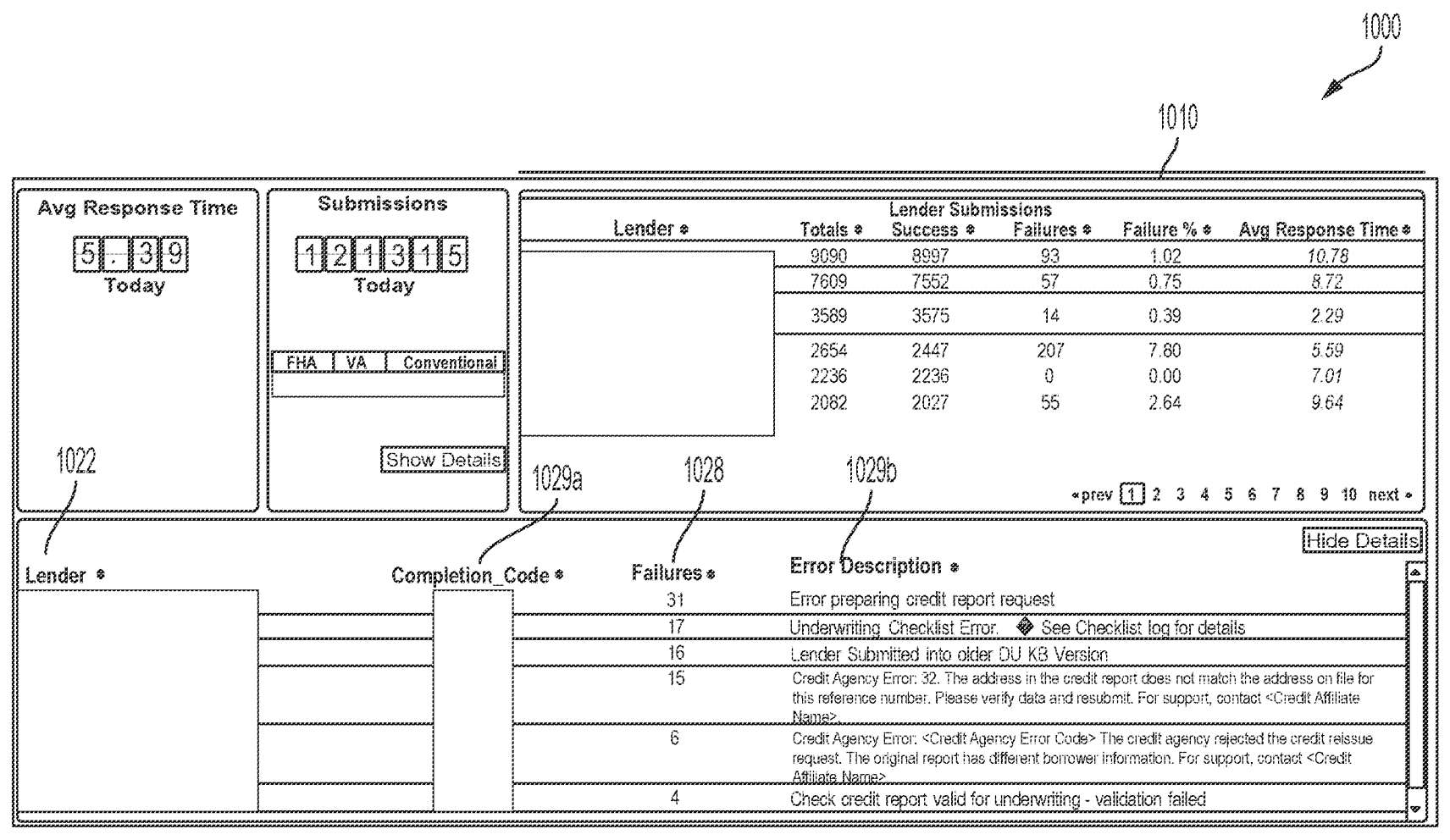
Figure 11:
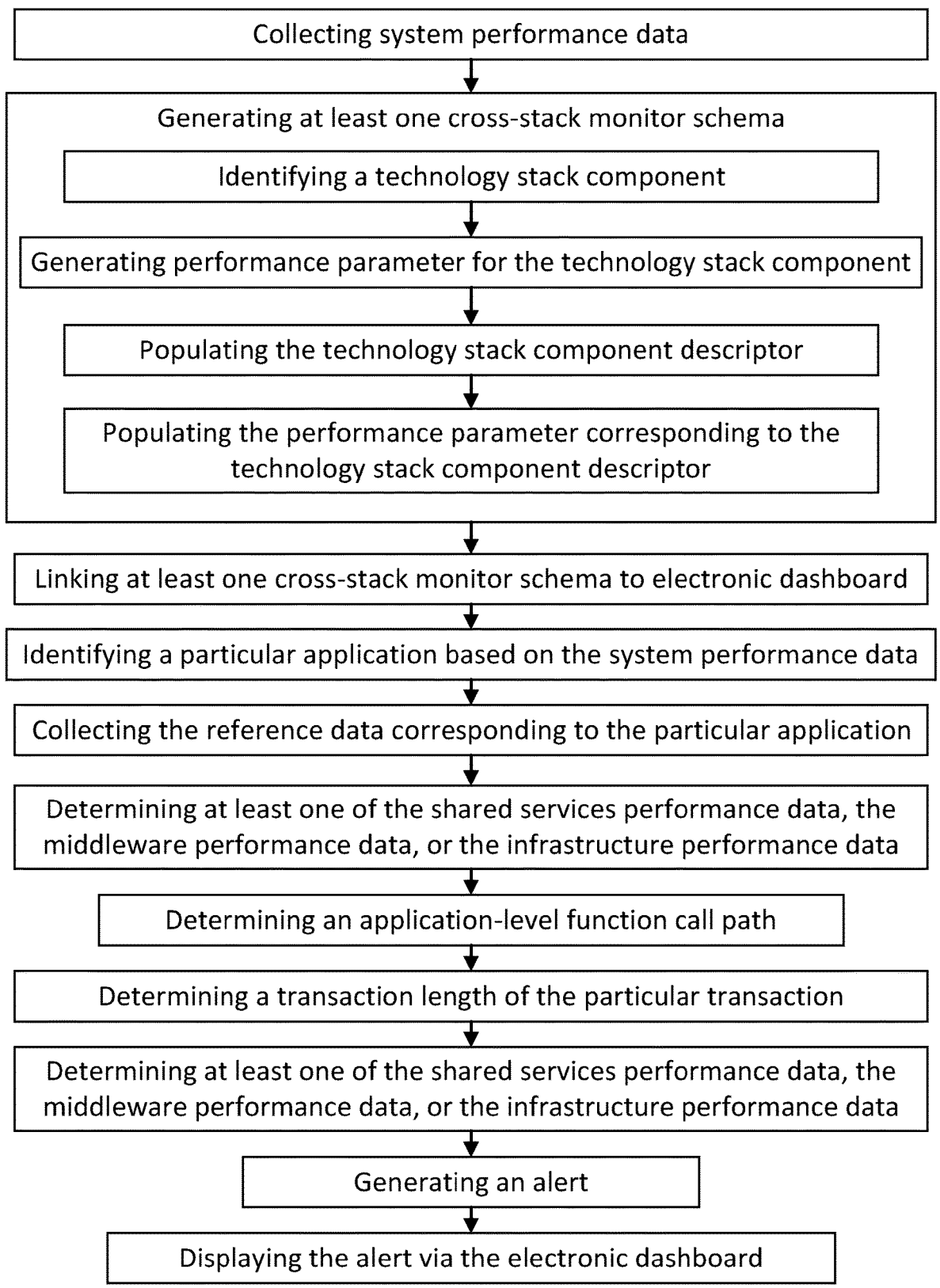
FIG. 11 is an example flowchart diagram illustrating a method for enterprise IT monitoring, according to an example embodiment.

Referring generally to FIG. 4-10, FIG. 4-7 show various front-end views of summarized information derived from a plurality of cross-stack monitor schemas. For example, the plurality of cross-stack monitor schemas may include individual monitor schemas for computer applications across a portfolio of technologies or across a portfolio or service lines or business units within an organization. The definitions for these schemas can be retrievably stored in one or more databases. An example monitor schema may include information about a computer application and its underlying supporting virtual and physical infrastructure, such as shared services, middleware, physical infrastructure components (e.g., network devices as described herein) and the like. FIG. 8 shows a front-end view of an example cross-stack monitor schema where the monitor schema represents a non-user-specific processing path across computing infrastructure (that is, performance metrics for transactions initiated by various users are combined). FIGS. 9 and 10 show various front-end views of an example endpoint-specific cross-stack monitor schema where a monitor schema includes performance parameters and associated information tailored to a particular entity or entities initiating or completing the transaction (e.g., a source system for incoming data, a particular user or group of users, etc.) The electronic dashboards described herein may display various warnings and alerts, which may be based on data from one or more cross-stack monitor schema(s).

Figure 4:
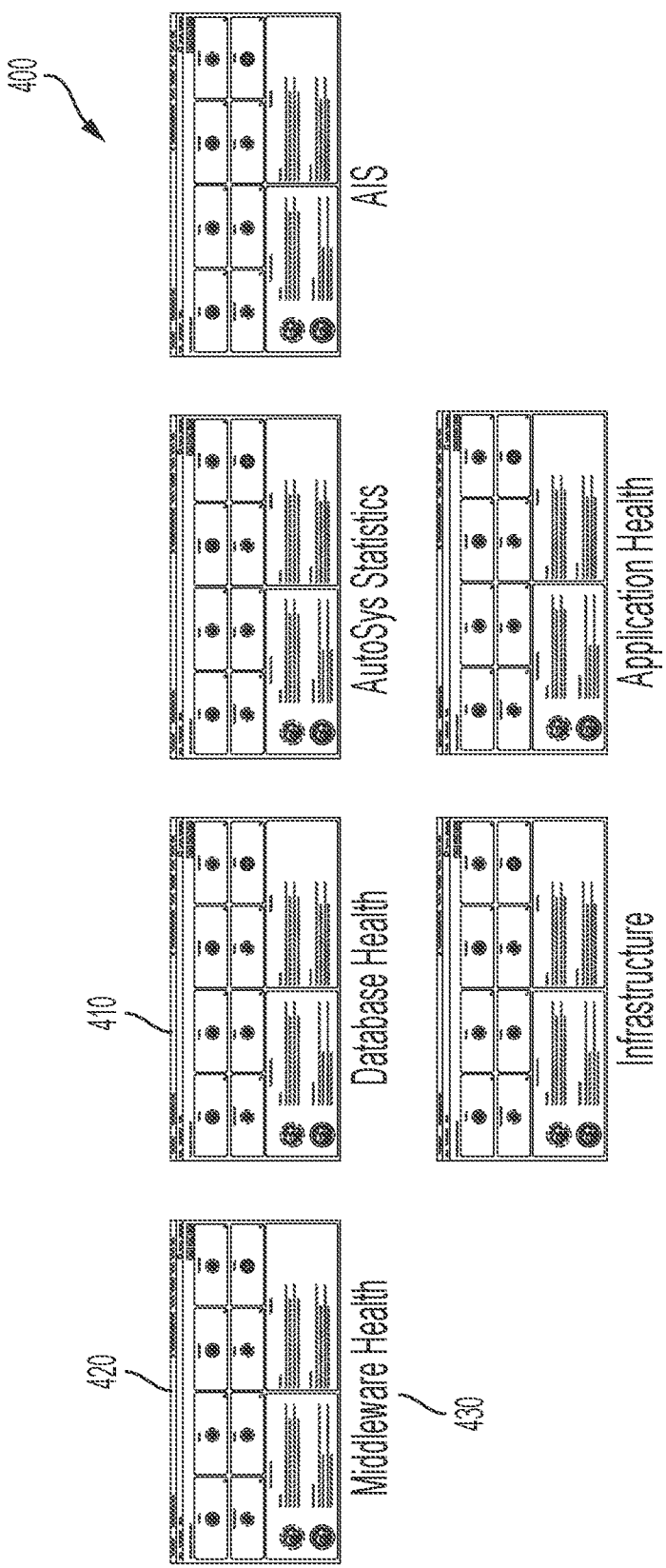
FIG. 4 is an example user interface diagram showing a service insights dashboard, according to an example embodiment.

Referring now to FIG. 4, an example user interface diagram 400 showing a service insights dashboard 410 is shown, according to an example embodiment. In an example arrangement, the service insights dashboard 410 may be included in the electronic dashboard 190 of FIG. 1. The service insights dashboard 410 may include a summary of component-level performance for the enterprise infrastructure monitoring system 100 of FIG. 1. FIG. 4 shows a front-end view of summarized information derived from a plurality of cross-stack monitor schemas. As shown, the service insights dashboard 410 includes a plurality of monitor controls 420, each corresponding to a particular component of the enterprise infrastructure, such as such as applications 122, shared services 124, middleware and infrastructure 126 of FIG. 1. Each monitor control may include data generated by the technology stack management circuit 150 of FIG. 1 for the particular component. The data may be summarized in a performance score. In some embodiments, the data may be color-coded according to the performance score's correspondence to a predetermined range and/or threshold.

Figure 5:
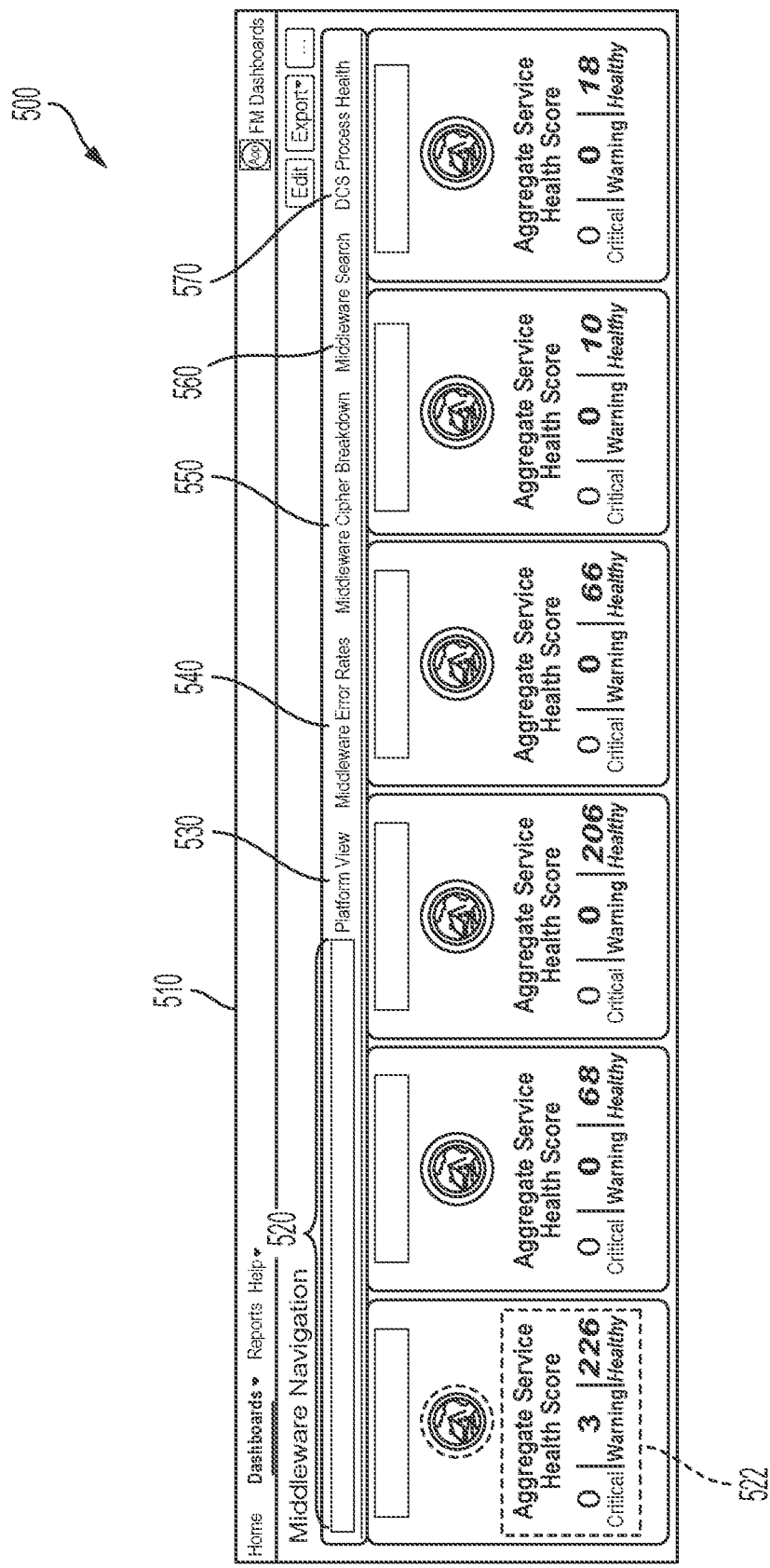
FIG. 5 is an example user interface diagram showing a middleware health dashboard, according to an example embodiment.

Referring now to FIG. 5, an example user interface diagram 500 showing a middleware health dashboard 510 is shown, according to an example embodiment. In an example arrangement, the middleware health dashboard 510 may be included in the electronic dashboard 190 of FIG. 1. FIG. 5 shows a front-end view of summarized information derived from a plurality of cross-stack monitor schemas. The middleware health dashboard 510 may include a summary of component-level performance for a component of the service insights dashboard 410 of FIG. 4. As shown, the middleware health dashboard 510 includes a plurality of monitor controls 522 for components 520-570. Each of the monitor controls 522 may show middleware health for a particular portfolio item. In an example embodiment, each portfolio item may represent an operational or technology unit 520 within an organization, such as capital markets, information security, enterprise data, etc. In some embodiments, the enterprise infrastructure monitoring system 100 of FIG. 1 is structured to dynamically generate a plurality of portfolio items based on reference data from a change management system or a similar system. In some embodiments, the middleware health dashboard 510 includes additional monitor controls 522, such as the platform view 530, the middleware error rates view 540, the middleware cipher breakdown view 550, the middleware search view 570, and/or a process health view 570. Each of the monitor controls 522 includes an aggregate service health score, which may include a breakdown of scores, error counts, etc. according to severity levels.

FIG. 6 is an example user interface diagram 600 showing a middleware health dashboard 610 for operational units within an enterprise infrastructure, according to an example embodiment. In an example arrangement, the middleware health dashboard 610 may be included in the electronic dashboard 190 of FIG. 1. FIG. 6 shows a front-end view of summarized information derived from a plurality of cross-stack monitor schemas. The middleware health dashboard 610 may include information about component-level performance for any of the components 520-570 of FIG. 5. As shown, the middleware health dashboard 610 includes a plurality of monitor controls 622 for components 520-570 of FIG. 5. Each of the monitor controls 622 may show information about middleware health for a particular sub-item in a portfolio item. In an example embodiment, each portfolio item may represent an operational or technology unit 620 within an organization, such as capital markets, information security, enterprise data, etc. Each sub-item may represent a more granular view of the enterprise infrastructure. In some embodiments, the middleware health dashboard 610 includes additional monitor controls 622, such as the platform view 630, the middleware error rates view 640, the middleware cipher breakdown view 650, the middleware search view 670, and/or a process health view 670. Each of the monitor controls 622 includes an aggregate service health score, which may include a breakdown of scores, error counts, etc. according to severity levels.

Referring now to FIG. 7, an example user interface diagram 700 showing a drill-down view 710 of a middleware health dashboard 510 of FIG. 5 and/or middleware health dashboard 610 of FIG. 6 is shown, according to an example embodiment. Upon detecting a user interaction (e.g., a click, a tap, or otherwise an indication that a user has selected a particular item via a user interface of a user computing device) with an example monitor control 722 (e.g., the monitor control 522 of FIG. 5 and/or the monitor control 622 of FIG. 6), a plurality of tiles is dynamically generated on the user interface display comprising the drill-down view 710. The plurality of tiles includes severity-level specific drill-downs for information presented in the corresponding monitor control 722. As shown, an example middleware health drill-down tile 725 shows, for each of a plurality of applications 726, their health scores 727, associated middleware components 728 (e.g., web servers, file servers, database servers, various computer-based services, etc.), and the associated technology. Upon detecting a user selection of a particular record displayed in the middleware health drill-down tile 725, the user is presented with a user interface similar to that of FIG. 8.

FIG. 8 is an example user interface diagram 800 showing server-level drill-down 810 of a middleware health dashboard 710 of FIG. 7, according to an example embodiment. FIG. 8 shows a front-end view of an example cross-stack monitor schema. As shown, the service analyzer 820 comprises a plurality of interactive controls structured to provide detailed information regarding a particular item selected as described relative to FIG. 7.

The service analyzer 820 may comprise a user-interactive tree comprising nodes indicative of a cross-stack hierarchy of nodes in a cross-stack monitor schema. The cross-stack hierarchy of nodes shows an end-to-end view of computing resources in a particular cross-stack monitor schema. For instance, as shown, the top-level node may comprise application-level information (e.g., a URL) and the lower-level nodes may comprise information about the underlying services, middleware, and physical infrastructure components that support the website or another resource identified by the URL (e.g., a file server, an interface engine's file intake directory, etc.). Upon detecting a user selection of a particular node, the node-specific tile 830 and the performance parameter tile 840 are populated with information corresponding to the node and retrieved by referencing the particular cross-stack monitor schema. The node-specific tile 830 may include an indication of severity 832, a KPI name 834, and a performance parameter value 836. The performance parameter value may be an actual value calculated for the corresponding node and performance parameter for a particular user-selectable period of time 860. Upon detecting a user interaction with a particular record in the node-specific tile 830, the performance parameter tile 840 may be populated with a plurality of monitoring data points for the particular records within the user-selectable period of time 860. The monitoring data points may include various attributes, including severity 842, node identifier 844, and monitoring data point value 846. In some embodiments, the relevant attributes are generated using a machine-learning algorithm.

Referring now to FIG. 9, an example user interface diagram 900 showing an endpoint-specific cross-stack monitor schema 910 is shown, according to an example embodiment. A cross-stack system health monitor may further include data pertaining to inbound and/or outbound actors such that system health monitors for operations that involve different actors are distinguishable even when the technical components involved are the same.

As shown, various items and information included in or derived from an endpoint-specific cross-stack monitor schema 910 may include one or more summary tiles for a particular performance parameter shared by records within the schema. Examples include average response time 940 and an average number of interface messages 950 (which may include a further breakdown 952 by type of the interface message). In some embodiments, information for the classifiers in the summary tiles (e.g., the categories to include in the further breakdown 952) is generated based on reference data. In some embodiments, information may be generated or programmatically inferred from the actual data (e.g., data collected by monitoring orchestrators 130 of FIG. 1) using machine learning.

As shown, various items and information included in or derived from an endpoint-specific cross-stack monitor schema 910 may include detail tiles for particular records within the schema. For example, the inbound interface messages tile 920 may include the source 922, a total number of messages 924, a successfully imported message count 926, a failed to import message count 928, a failure percentage 930, and an average response time 932, where the average response time may indicate an average processing time to receive, unpack, and import data from a particular interface message. Upon detecting a user selection of a particular record in the inbound interface messages tile, the user may be presented with a user-interactive interface as described relative to FIG. 10.

Referring now to FIG. 10, an example user interface diagram 1000 showing a drill-down view 1010 for a cross-stack monitor schema is shown, according to an example embodiment. A detail tile is generated for a particular user-selected entry and may include information from a particular endpoint-specific cross-stack monitor schema 910 of FIG. 9. As shown, and using the example of a schema related to monitoring an inbound data interface, the detail tile may include the source 1022, the completion code 1029a, the error message 1029b and the corresponding number of failures 1028 (e.g., interface messages that triggered the error). In some embodiments, the errors are application-level or business logic errors and the underlying infrastructure is expected to work normally. In some embodiments, the errors are system error flags raised by an application (e.g., "page not found" errors, server time-out errors, etc.) and a user may be presented with a navigable hyperlink corresponding to a service analyzer view for the underlying infrastructure components involved in the transaction, for example, as discussed relative to FIG. 8.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" (e.g., "engine") may include hardware structured to execute the functions described herein. In some embodiments, each respective "circuit" may include computer-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of computer-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the computer-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principles of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure.

What is claimed is:

1. A method for enterprise information technology (IT) monitoring, comprising:
   collecting, by a processing circuit comprising computer-executable instructions executed by a processor of a computing device, system performance data for an enterprise computing environment;
   generating, by a management circuit, at least one cross-stack monitor schema comprising a technology stack component descriptor, application performance data, a performance parameter, and at least one of shared services performance data, middleware performance data, or infrastructure performance data corresponding to the application performance data, the generating at least one cross-stack monitor schema comprising:
based on applying reference data to the system performance data, identifying a technology stack component, wherein the reference data comprises change management database data,
based on the system performance data, generating the performance parameter for the technology stack component,
populating the technology stack component descriptor based on the reference data, and
populating the performance parameter corresponding to the technology stack component descriptor with at least a subset of the system performance data;
linking, by an electronic dashboard circuit, the at least one cross-stack monitor schema to an electronic dashboard, the electronic dashboard accessible via a user interface of an administrator computing device;
identifying, by the management circuit, a particular application based on the system performance data;
collecting, by the management circuit via a reference data management system, the reference data corresponding to the particular application;
based on the reference data, determining, by the management circuit, the at least one of the shared services performance data, the middleware performance data, or the infrastructure performance data;
determining, by the management circuit, an application-level function call path for at least one function call corresponding to the particular application, wherein the at least one function call is representative of a particular transaction;
based on an execution length of the at least one function call in the application-level function call path, determining, by the management circuit, a transaction length of the particular transaction;
when the transaction length exceeds a predetermined threshold, determining, by the management circuit, the at least one of the shared services performance data, the middleware performance data, or the infrastructure performance data for the particular application;
generating an alert related to at least one of the particular application, the shared services performance data, the middleware performance data, or the infrastructure performance data; and
displaying the alert via the electronic dashboard;
based on the system performance data, identifying the technology stack component as an underperforming component;
generating a remediation recommendation corresponding to the underperforming component;
performing a system action on the underperforming component;
deactivating the underperforming component; and
terminating a system process associated with a particular user.

2. The method of claim 1, further comprising:
generating a remediation recommendation corresponding to the alert, the remediation recommendation comprising a reference to the at least one of the particular application, the shared services performance data, the middleware performance data and the infrastructure performance data.

3. A method for system self-correction across an enterprise technology stack, the method comprising:

determining an application-level function call path for at least one function call corresponding to a particular application, wherein the at least one function call is representative of a particular transaction;
based on an execution length of the at least one function call in the application-level function call path, determining a transaction length of the particular transaction;
identifying a system performance issue related to the particular application;
based on reference data for the particular application, wherein the reference data comprises change management database data, and when the transaction length exceeds a predetermined threshold, determining at least one of a shared services component, a middleware component, and an infrastructure component corresponding to the particular application;
generating an alert related to at least one of the particular application, the shared services component, the middleware component, and the infrastructure component;
displaying the alert via an electronic dashboard, the electronic dashboard accessible via a user interface of an administrator computing device;
receiving system performance data corresponding to the at least one of the shared services component, the middleware component, and the infrastructure component;
based on the system performance data, identifying an underperforming component from among the at least one of the shared services component, the middleware component and the infrastructure component;
generating a remediation recommendation corresponding to the underperforming component;
performing a system action on the underperforming component;
deactivating the underperforming component; and
terminating a system process associated with a particular user.

4. The method of claim 3, wherein the system performance issue relates to a timing of a particular system-executed process associated with operation of the particular application.

5. The method of claim 3, wherein the underperforming component comprises at least one of a web server, a database server, an operating system-executed process, and a network device.

6. A non-transitory computer-readable medium (CRM) comprising computer-executable instructions stored thereon that, when executed by at least one processor, cause the at least one processor to perform operations comprising:
generate a cross-stack monitor schema comprising system performance information related to a particular application, and at least one of a shared services component, a middleware component, or an infrastructure component corresponding to the particular application, wherein the at least one of the shared services component the middleware component, or the infrastructure component is identified based on monitoring function calls of the particular application, and wherein reference data comprises change management database data;
determine an application-level function call path for at least one function call corresponding to the particular application, wherein the at least one function call is representative of a particular transaction;

based on an execution length of the at least one function call in the application-level function call path, determine a transaction length of the particular transaction;

when the transaction length exceeds a predetermined threshold, retrieve the system performance information from the cross-stack monitor schema for the particular application;

generate an alert related to at least one of the particular application and the system performance information;

generate an electronic dashboard comprising the alert and the system performance information;

cause the electronic dashboard to be displayed on a display of a computing device;

receive system performance data corresponding to the at least one of the shared services component, the middleware component, or the infrastructure component;

based on the system performance data, identify an underperforming component from among the at least one of the shared services component, the middleware component, or the infrastructure component;

generate a remediation recommendation corresponding to the underperforming component;

perform a system action on the underperforming component;

deactivate the underperforming component; and terminate a system process associated with a particular user.

7. The non-transitory CRM of claim 6, wherein the system performance information comprises a system health category.

8. The non-transitory CRM of claim 6, wherein the system performance information comprises a system health score.

9. The non-transitory CRM of claim 6, the computer-executable instructions comprising:
   determine a first user entity associated with the particular application;
   determine a second user entity associated with the particular application;
   generate first system performance information corresponding to the first user entity and second system performance information corresponding to the second user entity; and
   cause the electronic dashboard to display the first system performance information and the second system performance information.

10. The non-transitory CRM of claim 9, wherein the first user entity is an inbound data source or an outbound data source.

11. The non-transitory CRM of claim 9, wherein the first user entity is a particular business unit.

12. The non-transitory CRM of claim 6, wherein the system performance information displayed on the electronic dashboard comprises a plurality of nodes, each of the plurality of nodes corresponding to a system component associated with the particular application.

* * * * *